June 21, 1949.   E. V. COLLINS   2,473,786
ROTARY EARTH SCRAPER
Filed Dec. 22, 1945   2 Sheets-Sheet 1
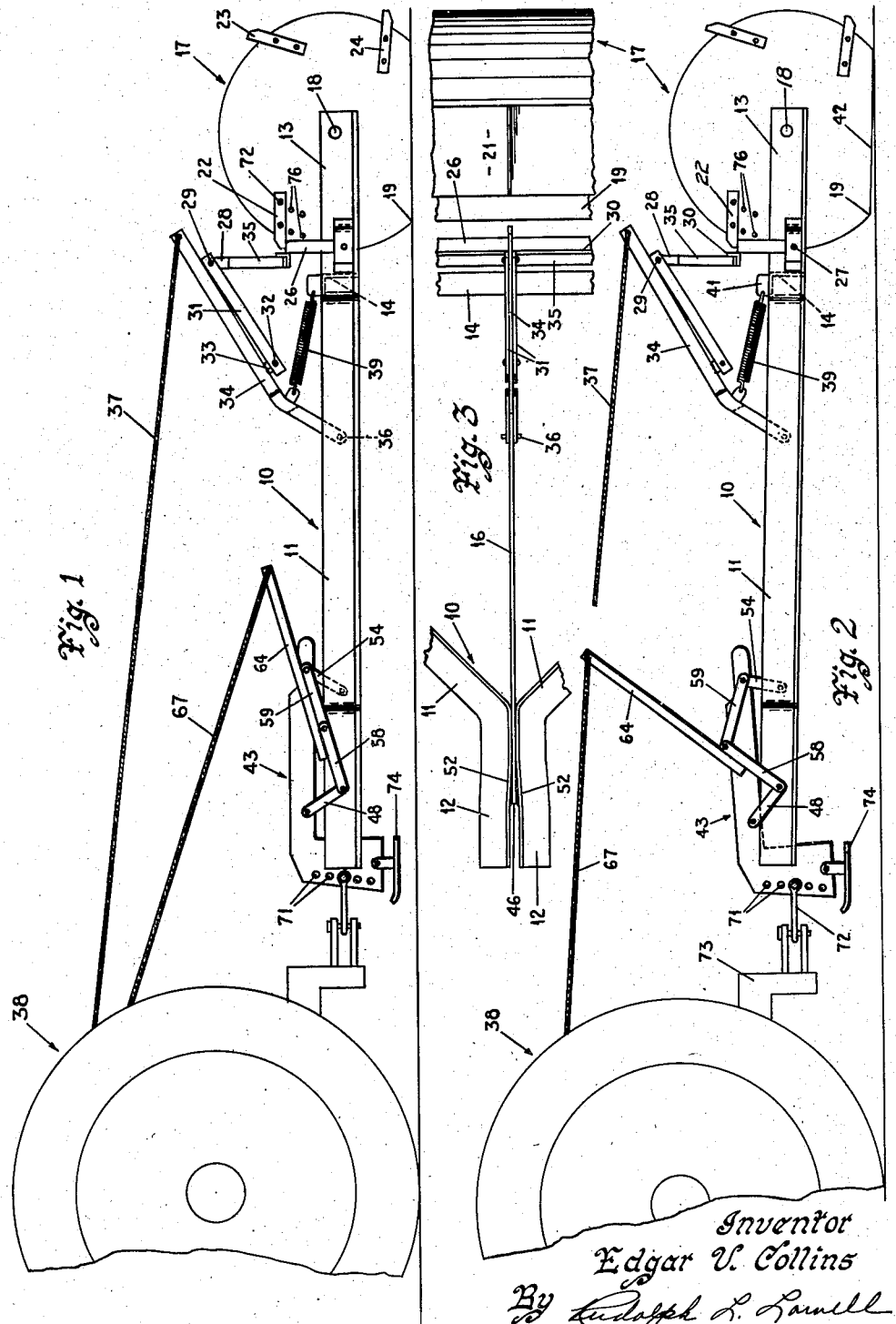
Inventor
Edgar V. Collins
By Rudolph L. Lowell
Attorney

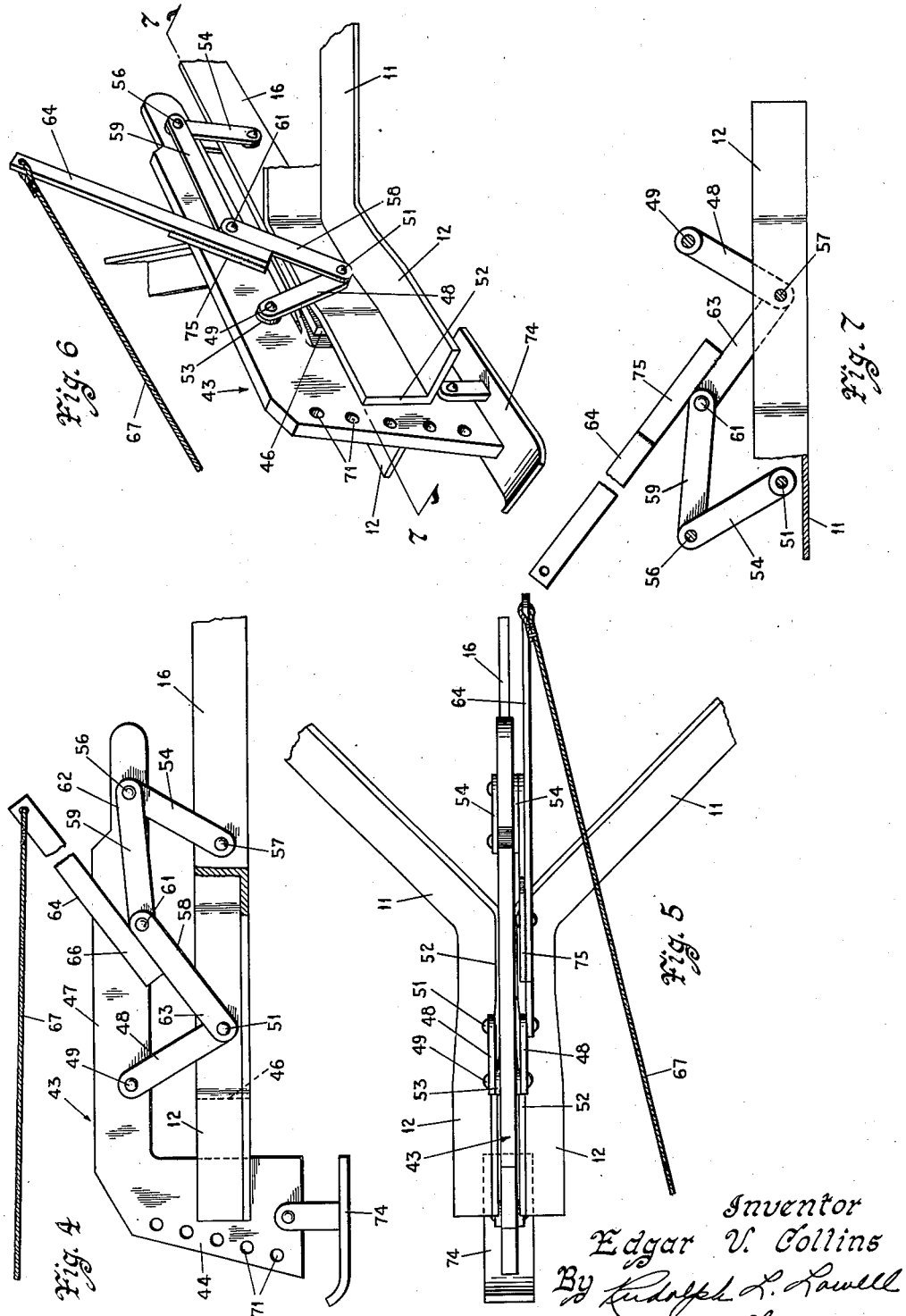

Patented June 21, 1949

2,473,786

UNITED STATES PATENT OFFICE 2,473,786

ROTARY EARTH SCRAPER

Edgar V. Collins, Ames, Iowa

Application December 22, 1945, Serial No. 636,695

5 Claims. (Cl. 37—140)

1

This invention relates generally to rotary earth scraper machines and in particular to a hitch device for a scraper machine adapted to provide for a unit movement of the machine frame and scraper such that the scraper, while in a normal earth scraping position relative to the frame, is moved to an earth carrying position.

An object of this invention is to provide an improved rotary scraper machine.

A further object of this invention is to provide a rotary scraper machine having a hitch member movably supported on a tongue, fixed on the machine frame, such that the tongue is movable relative to the hitch member to two moved positions providing for the movement of the scraper to earth scraping and carrying positions.

Another object of this invention is to provide a rotary scraper machine in which a scraper, in a normal earth scraping position, is movable, together with its supporting frame, to an earth carrying position.

Yet a further object of this invention is to provide a rotary scraper machine in which a hitch member and a tongue member are assembled for movement to two relative operating positions, so that a scraper in a fixed position relative to the tongue, is movable with the tongue to earth scraping and earth carrying positions.

A feature of this invention is found in the provision of a rotary scraper machine, having a hitch device connectible with a fixed tongue for the machine by a link system, including toggle links capable of releasably locking the link system to hold a hitch member and the tongue in a fixed relative position providing for an earth scraping position of the scoop or bucket of the machine. On a manual actuation of the toggle links to release the link system, from its locked position, the bucket and tongue are movable as a unit, relative to the hitch member, to provide for the bucket being in an earth carrying position.

Further objects, features and advantages of this invention will become apparent from the following description when taken in connection with the accompanying drawings in which:

Fig. 1 is a side elevational view of a rotary scraper machine embodying the hitch device of this invention;

Fig. 2 is a side elevational view, illustrated similarly to Fig. 1, and showing parts in changed positions relative to their showing in Fig. 1;

Fig. 3 is a fragmentary plan view of the scraper machine in Figs. 1 and 2 with the hitch device removed;

Fig. 4 is a side elevational view of the hitch device shown in assembly relation with the tongue of the scraper machine; with certain parts being broken away and shown in section to more clearly show such assembly;

Fig. 5 is a plan view of the hitch device and tongue assembly shown in Fig. 4;

Fig. 6 is a perspective view of the hitch and tongue assembly shown in Fig. 4; and Fig. 7 is a sectional view taken on the line 7—7 in Fig. 6.

With reference to the drawings the hitch device of this invention is illustrated in Figs. 1 and 2 in assembly with a rotary scraper machine including a main frame, indicated generally as 10, comprised of a pair of angle iron side members 11, faced outwardly, and having forward sections 12 (Fig. 3) arranged in a parallel spaced relation adjacent to each other. From their forward sections 12 the members 11 diverge outwardly and rearwardly, and terminate in rear straight sections 13, which are connected together at their front ends by a transverse member 14. A longitudinal member 16 has its front end positioned between and welded to the forward sections 12 of the side members 11, while its rear end is connected with the transverse member 14. The longitudinal member 16 constitutes a fixed tongue for the scraper machine frame 10.

A rotary scraper or bucket, indicated generally as 17, is rotatably supported on a shaft 18 carried between the rear sections 13 of the frame side members 11. The bucket 17 is provided with a scraper blade 19 and an opening 21 for admitting the dirt, which is scraped, into the bucket. Spaced circumferentially about the ends of the bucket 17 are stop or lug members 22, 23 and 24, it being understood that these lugs are in pairs arranged oppositely from each other on the bucket 17.

The stop members 22, 23 and 24 are selectively engageable with a transverse bumper bar or stop member 26, of a generally inverted U-shape having the free ends of its legs pivoted at 27 to the rear sections 13 of the side members 11 (Figs. 1 and 3). Extended across the front side of the stop bar 26 in an angle member 30 provided with an upright member 28, the upper end of which is pivotally connected at 29 to the upper end of a rearwardly and upwardly extended pivoted link 31, the lower end of which link is pivoted at 32 to a projection 33 on the under side of a pivoted arm 34. Brace members 35 are connected between the upper end of the upright member 28 and the opposite ends of the angle member 30.

The lever arm 34 is extended in a generally upward and rearward direction and has a lower end of a bifurcated construction arranged in a straddled relation with the longitudinal member 16 and pivotally supported at 36 on the member 16. Connected to the upper end of the lever arm 34 is a rope or cable 37 which is extended forwardly to a position adjacent the operator's seat (not shown) of a tractor unit indicated generally as 38. The bar 26 is yieldably retained in a position for engaging the stop members 22, 23 and 24 by means of a tension spring 39 connected between the lower end of the lever arm 34 and an upright projection 41 on the transverse connecting member 14.

When the stop members 22, are engaged with the stop bar 26, as illustrated in Fig. 1, the scraper blade 19 of the bucket 17 is in an earth scraping position. On a forward movement of the lever arm 34, or towards the left, as viewed in Figs. 1 and 2, the bar 26 is moved out of engagement with the stop members 22. On release of the lever arm 34, and a return of the stopper bar 26, by the spring 39, to a lug engaging position the lugs 23 are engaged with the stop bar 26 to provide for a dirt spreading position for the bucket 17. In other words, the opening 21 is not fully open to the ground surface. On a second release and return of the bar 26, by manipulation of the lever arm 34, the lugs 24 are engaged with the stop bar 26, to provide for a dumping position of the bucket 17, at which all of the bucket opening 21 is open to the ground surface.

In the use of the rotary scraper machine dirt is often scraped at one location and then carried to a second location remotely located from the dirt pick-up location. Since the bucket 17 rides directly on the ground surface it is necessary that the bucket 17, in a load carrying position, have its scraper blade 19 spaced above the ground surface so that the rear end of the bucket bottom side 42 is in riding engagement with the ground surface as illustrated in Fig. 2. This load carrying position of the bucket 17 is accomplished by the hitch device of this invention, which will now be described.

The hitch device (Figs. 4, 5 and 6), is comprised of a hitch member, designated generally as 43, which is of a flat form and of a generally L-shape. The short leg or front portion 44 of the hitch member is arranged in an upright and guided position between the front ends of the forward sections 12 of the frame side members 11. The front end 46 of the longitudinal tongue member 16 terminates short of the front ends of the forward sections 12 a distance sufficient to accommodate the reception therebetween of the front upright portion 44. The long leg or rear portion 47 of the hitch member 43 is arranged longitudinally of the tongue 16 and extends in a rearward direction at a position generally above the longitudinal member 16.

The hitch member 43 is movably connected with the tongue 16 by a link system comprising a pair of front links 48 (Figs. 5 and 6) arranged at opposite sides of the hitch member 43. The links 48 are inclined upwardly and forwardly and have their upper ends pivoted on a pin 49 carried in the rear portion 47 of the hitch member 43. The lower ends of the links 48 are pivoted on a pin 51 extended through the tongue 16 and through the upright legs 52 of the forward sections 12. Spacer collars 53 are mounted on the pivot 49 to opposite sides of the hitch member 43 to maintain the links 48 in parallel planes.

A pair of rear links 54 (Figs. 5 and 6) are also arranged at opposite sides of the hitch member 43 and are inclined upwardly and rearwardly, with their upper ends being pivoted on a pin 56 carried adjacent the rear end of the hitch member portion 43. The lower ends of the links 54 are pivoted on a pin 57 carried in the tongue member 16. It is seen, therefore, that the pivot pins 51 and 57 are spaced apart a distance which is less than the distance between the pivot pins 49 and 56 in the hitch member 43.

A pair of toggle links (Figs. 4 and 6) have one of their ends pivotally connected together by a pin 61, with the opposite end 62 of the toggle link 59 being pivotally supported on the pin 56, while the opposite end 63 of the toggle link 58 is pivotally supported on the pin 51. A lever arm 64 for actuating the toggle links 58 and 59 has one end 66 secured to the upper end of the toggle link 58 such that the lever arm is inclined upwardly and rearwardly parallel with the toggle link 58. The upper end of the lever arm 64 is connected with a rope or cable 67 which extends forwardly to a position adjacent the operator's seat on the tractor 38.

In one embodiment of the invention the links 48 and 54 are seven inches in length between their pivots 49 and 51 and 56 and 57, respectively, while the toggle links 58 and 59 have a length of eight inches between the pivots 51, 61 and 56. The pivots 49 and 56, in this embodiment, are spaced sixteen inches apart, while the pivots 51 and 57 are spaced ten inches apart.

The front edge of the upright portion 44 of the hitch member 43 is provided with a series of openings 71 for selectively receiving a clevis 72 which is carried on a drawbar 73 of the tractor 38. Pivotally supported from the lower end of the upright portion 44 is a sled member 74 for a purpose which appears later.

In the operation of the hitch device its connecting link system with the tongue member 16 is locked against movement by the positioning of the toggle links 58 and 59 in their longitudinally aligned positions illustrated in Fig. 1, whereby the hitch member 43 and the tongue member 16 are in fixed relative positions. In this fixed relative position the scraper blade 19 of the bucket 17 is adapted to be in an earth scraping position when the stop lugs 22 are in engagement with the stop bar 26.

On the application of a pulling force, by the tractor 38, on the hitch member 43, a force in a forward direction is applied on the upper ends of the links 48 and 54 tending to rotate these links in a counter-clockwise direction as viewed in Fig. 1. In order to prevent such counter-clockwise movement of the links 48 and 54, and a consequent movement of the toggle links 58 and 59 in a downward direction out of their relatively longitudinally aligned positions, the lever arm 64 (Fig. 7) is provided adjacent its lower end with a stop member 75 adapted for abutting engagement with the toggle link 59, when the toggle links are in their longitudinally aligned positions.

To provide for the movement of the bucket 17 from an earth scraping position to an earth carrying position it is only necessary to pull forwardly on the lever arm 64 whereby the toggle links 58 and 59 are released for pivotal movement upwardly out of their longitudinally aligned positions. On a release of the toggle links 58 and 59 the links 48 and 54 are movable to their positions illustrated in Fig. 2. The movement of the links 48 and 54, from their positions shown in Fig. 1 to their positions shown in Fig. 2, provides for a relative movement between the tongue 16 and the hitch member 43 to their relative positions shown in Fig. 2.

In the use of the hitch of this invention it has been found that the hitch member 43, on release of the toggle links 58 and 59, pivotally moves a small amount in a counter-clockwise direction, as viewed in Figs. 1 and 2, about its pivotal connection with the clevis 72, while the tongue 16 is tipped upwardly, as shown in Fig. 2, from its position shown in Fig. 1. In other words, the tongue 11 pivots in a clockwise direction, as viewed in Figs. 1 and 2, about the pivotal support 18 for the frame side members 11. Since the stops 22, on actuation of the lever 64 to release the toggle links 58 and 59, remain engaged with the stop bar 26, the bucket 17, on upward tilting of the tongue 16, is moved as a unit with the frame 10 whereby the scraper blade 19 is elevated about the ground surface to its position shown in Fig. 2.

During the release of the toggle links 58 and 59, from their aligned locking position shown in Fig. 1, to their broken position shown in Fig. 2, it is only necessary to apply a manual pressure on the lever arm 64 until the toggle links 58 and 59 are in substantially their relative positions shown in Figs. 4, 5 and 6. The continued movement of the toggle links 58 and 59 is accomplished by virtue of the pulling action applied on the hitch member 43 by the tractor 38. The release of the toggle links is thus a semi-automatic action.

On carrying of the load to a desired dumping position, the lever arm 34 is operated in a usual manner to selectively engage the stops 23 and 24 with the stop bar 26 to accomplish either a spreading or a complete dumping of the dirt from the bucket 17. In practice it has been found that on release of the bar 26 from an engaged position with the stops 24, and rotation of the bucket 17 to engage the stops 22 with the stop bar 26, the impact of the stops 22 against the bar 26 is sufficient to automatically return the toggle links 58 and 59 to their locking positions shown in Fig. 1. As a result the relative movements of the hitch member 43 and the tongue 16 to their positions shown in Fig. 1, providing for a scraping action of the bucket 17, takes place automatically by virtue of the impact force of the stops 22 against the bar 26 resulting from the rotational movement of the bucket 17 through an angular distance corresponding to the angular distance between the stops 24 and 22, when the bucket 17 is rotated in a counter-clockwise direction as viewed in Figs. 1 and 2. This impact force is generally sufficient to pivotally move the frame 10 in a clockwise direction, as also viewed in Fig. 1, until the toggle links 58 and 59 are in their longitudinally aligned locking positions.

Oftentimes, in the use of a scraper machine, it is necessary to fill a hole or a ditch through which it is impossible to drive the tractor 38. To fill a hole or a ditch, under these conditions, a chain (not shown) is substituted for the clevis 72, whereby the forward end of the frame 10 is supported through the hitch member 43 on the sled member 74. The chain is suitably connected with one of the openings 71 in the hitch member 43 and the stops 22 are adjustable relative to the bucket 17 by the provision of a series of openings 76 adapted to receive the bolts 77 for securing the stops 22 to the bucket 17. The adjustment of the stops 22 on the bucket 17 and the connection of the chain in a selected one of the openings 71 are relatively made to provide for the bucket 17 being in an earth scraping position when the hitch device is in its locked position shown in Fig. 1.

By virtue of the chain connection between the tractor and the scraper machine, the tractor can be driven around the edge of the ditch or hole to be filled, to a position at which the scraping machine can be pulled across the hole or the ditch. In transporting the load from a dirt pick-up position to a dirt dumping position, the hitch device, with a chain connection between the scraper machine and the tractor, is operated in all respects similar to its operation as described in connection with Figs. 1 and 2.

From a consideration of the above description it is seen that the invention provides a hitch device for a rotary scraper machine which is of a compact and rugged construction, and movably assembled with a fixed tongue 16 on the machine frame 10 to provide for a movement of the bucket 17 from an earth scraping position to an earth or load carrying position, while the bucket 17 is retained in a normal earth scraping position relative to the machine frame 10. The initial actuation of the hitch device, to provide for the movement of the bucket from an earth scraping position to a load carrying position, is accomplished manually with its actuation finally being accomplished by the pulling action of the tractor on the hitch member 43. Since the hitching device is automatically returned to a position providing for a scraping position of the bucket 17 the complete operation of the device requires a minimum of manual effort and attention.

Although the invention has been described and illustrated with respect to a preferred embodiment thereof it is to be understood that it is not to be so limited since changes and modifications can be made therein which are within the full intended scope of this invention as defined by the appended claims.

I claim:

1. In a rotary scraper machine having a main frame including a tongue, and a bucket rotatably carried adjacent the rear end of the frame, a hitch member having a forward portion adapted for connection with a tractor unit, and a rear portion extended in a spaced relation longitudinally of the tongue, means movably supporting said hitch member on said tongue including an upwardly and forwardly inclined first link, and an upwardly and rearwardly inclined second link, means pivotally connecting said first and second links with said tongue and with the rear portion of said hitch member, a pair of toggle links pivotally connected together at one of their ends, with the opposite end of one of said toggle links being pivoted on the pivot for the lower end of said first link, and the opposite end of the other one of said toggle links being pivoted on the pivot for the upper end of said second link, said toggle links, at one moved position of said first and second links being in substantial longitudinal alignment to releasably lock said first and second links in said one moved position, and manually actuated means for moving said toggle links out of longitudinal alignment to release said first and second links for movement to a second position.

2. In a rotary scraper machine comprising a main frame having a tongue fixed at one end, and a scraper bucket rotatably supported at its other end, means for holding the bucket in a scraping position, means providing for the movement of the bucket from said scraping to a load carrying position, when the bucket is held in a scraping position including a hitch member having a forward portion adapted for connection with a tractor unit, and a rear portion extended in a spaced relation substantially longitudinally of said tongue, a pair of reversely inclined pivoted links connecting said hitch member and said tongue, a toggle means for releasably locking said links in a first position against pivotal movement, when the bucket is in said scraping position, said toggle means including a first member pivotally connected with the hitch, and a second member pivotally connected with the tongue, and means for actuating said toggle means to provide for the movement of said links to a second position, with said bucket being movable to an earth carrying position in response to the movement of said links from said first position to said second position.

3. In a rotary scraper machine comprising a frame having a fixed tongue member, a bucket rotatably supported on said frame, coacting means on said bucket and on said frame for releasably locking the bucket in an earth scraping position, means providing for the movement of said frame, when the bucket is in said earth scraping position, to a position at which the bucket is in an earth carrying position including a hitch member having a front portion adapted for connection with a tractor unit, and a rear portion extended in a spaced relation longitudinally of said tongue, a pair of reversely inclined upwardly extended pivoted links pivotally connected between said tongue and said rear portion, toggle links for releasably locking said pair of links against pivotal movement, in a first moved position therefor, to hold said hitch member and tongue against relative movement at a position corresponding to the scraping position for said bucket, and means for moving said toggle links to release said pair of links for movement to a second moved position therefor, whereby said hitch member and tongue are relatively movable to positions providing for the movement of the bucket to an earth carrying position.

4. In a rotary scraper machine having a frame with a fixed tongue at one end and a bucket rotatably supported adjacent its other end, coacting means on said frame and said bucket adapted to releasably hold the bucket in an earth scraping position, means providing for the movement of said frame, when the bucket is in said earth scraping position, to a position at which the bucket is in an earth carrying position including a hitch member having a portion, at the forward end of said tongue, adapted to be connected with a tractor unit, and a rear portion extended longitudinally of said tongue, a pair of upwardly extended reversely inclined links pivotally connected between said rear portion and said tongue and spaced longitudinally of said tongue, toggle links for locking said pair of links against pivotal movement in one position corresponding to a first position of said tongue relative to said hitch member at which said bucket is in said scraping position, and manual means for actuating said toggle links to release said pair of links for movement to another position therefor to provide for a relative movement between said tongue and hitch member to positions at which the bucket is in an earth carrying position.

5. In a rotary earth scraper machine including a frame having a fixed tongue at one end, and a rotatable scraper adjacent its opposite end, a hitch member having a front portion adapted for connection with a tractor unit, and a rear portion extended longitudinally of said tongue, a front upwardly and forwardly inclined link pivoted between said tongue and rear portion, a rear upwardly and rearwardly extended link pivoted between said tongue and rear portion, a pair of toggle links pivoted together at one of their ends, with the opposite end of one of said toggle links being pivoted on the pivot for the lower end of said front link, and the opposite end of the other of said toggle links being pivoted on the pivot for the upper end of said rear link, means for releasably locking said toggle links in substantially longitudinally aligned positions to provide for a first position of said tongue relative to said hitch member, and means for releasing said locking means to provide for the movement of said tongue into a second position relative to said hitch member.

EDGAR V. COLLINS.

REFERENCES CITED

The following references are of record in the file of this patent:

UNITED STATES PATENTS

| Number | Name | Date |
|---|---|---|
| 1,862,903 | Olinger | June 14, 1932 |
| 2,020,555 | Kerber | Nov. 12, 1935 |